Patented Nov. 3, 1953

2,658,085

UNITED STATES PATENT OFFICE 2,658,085

CHLORINATION OF CYCLOPENTADIENE

Morton Kleiman, Chicago, Ill., assignor to Arvey Corporation, a corporation of Illinois No Drawing. Application September 27, 1950, Serial No. 187,140

5 Claims. (Cl. 260—648)

This invention relates to a novel process for chlorinating cyclopentadiene and particularly for preparing hexachlorocyclopentadiene. More specifically, this invention relates to a means for preparing hexachlorocyclopentadiene by chlorinating cyclopentadiene with an aqueous solution of alkali metal hypochlorites in the presence of a catalyst.

It is known that hexachlorocyclopentadiene can be prepared by reacting cyclopentadiene with a hypochlorite. [Straus, Ber. 63B, 1884, (1930).] However, the process as heretofore known, is subject to a number of disadvantages, especially when carried out on a commercial scale. Thus, in the reaction to produce hexachlorocyclopentadiene from a hypochlorite as heretofore practiced, there also take place competing reactions which are harmful not only in that they diminish the yield of desired hexachlorocyclopentadiene, but also in that they adversely affect the nature and course of the reaction and further adversely affect the physical characteristics of the crude product insofar as color, separability from the reaction mixture, boiling range, and the like are concerned.

In accordance with the present invention it has been found that most of these adverse effects can be either completely eliminated or substantially alleviated by adding to the reaction mixture comprising cyclopentadiene and a hypochlorite, a catalyst of a specific type hereinafter defined. Whether the adverse effects noted in the prior process when accomplished in the absence of catalyst are due completely to competing side reactions and what the action of my catalyst is in alleviating these conditions is not completely known; however, it has been found according to the present invention that the type of catalyst herein disclosed does minimize side reactions, and does enhance the yield of crude chlorinated cyclopentadiene as well as the yield of hexachlorocyclopentadiene as distinguished from the reaction in the absence of such catalyst.

Exemplary of the side reactions which may occur in the process and which are minimized by the present invention are the reactions cyclopentadiene undergoes with itself to form resinous polymers or Diels-Alder addition products; the reaction of hypochlorite with cyclopentadiene to form less than a hexachlorinated derivative thereof; and others of unknown character which produce undesirable viscous oils and solids.

One object of the present invention is to improve the yield of chlorinated cyclopentadiene obtained from the process of chlorinating cyclopentadiene with an alkali metal hypochlorite. It is a further object of the present invention to improve the yield of hexachlorocyclopentadiene obtained from said process.

Another object of the present invention is to minimize competing side reactions in the process of preparing hexachlorocyclopentadiene by the chlorination of cyclopentadiene.

Another object of the present invention is to increase the efficiency of utilization of hypochlorite and of cyclopentadiene in said process.

Other objects are to improve the color of the chlorinated cyclopentadiene product; to decrease the amount of viscous oils and solids formed as by-products and thereby to decrease contamination of the product and to facilitate its separation from the aqueous phase of the reaction mixture.

These and other objects of the present invention will be apparent from the following description, examples and data.

Broadly, the present invention involves the use of a catalyst in the chlorination of cyclopentadiene with an alkali metal hypochlorite to produce hexachlorocyclopentadiene. The catalyst for the present process is a compound containing a sulfamic group; it can be added to the reaction mixture as a sulfamic acid or as a salt thereof, i. e. a sulfamate. It is understood that sulfamic groups are groups having the arrangement —O₃S—N<. The group of catalysts which can be utilized in this process have the chemical formula

where M is a cation such as hydrogen or a metal, $n$ is the valence of M, X is hydrogen or chlorine and R is hydrogen or a hydrocarbon group. The hydrocarbon group may be any hydrocarbon group. Representative thereof are alkyl groups such as methyl, ethyl, propyl and isopropyl groups, such as phenyl and naphthyl groups, aralkyl groups such as benzyl, beta-phenylethyl, and gamma-phenylpropyl groups, alkaryl groups, such as tolyl and xylyl groups, cycloalkyl groups such as cyclobutyl, cyclopentyl and cyclohexyl groups, and substituted cycloalkyl groups such as 2-methyl-cyclohexyl and 2-phenylcyclohexyl groups. Hydrocarbon groups containing less than 13 carbon atoms are preferred, whereas it is still more preferred that R be hydrogen.

Exemplifying the catalysts which may be used and which conform to the formula above given are

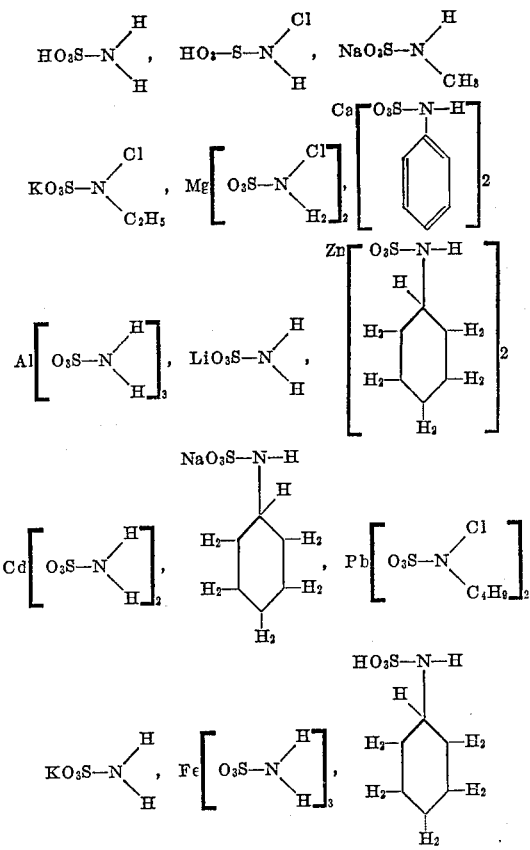

Sulfamates wherein M is hydrogen or alkali metal are preferred because of the univalent properties of said hydrogen or alkali metal. Where M is hydrogen, the catalyst is a sulfamic acid, and, upon its addition to aqueous hypochlorite, the acid catalyst will be neutralized to its corresponding salt, since to prevent decomposition, aqueous hypochlorite is always kept alkaline. It is thus immaterial whether the catalyst is added as an acid or as a salt. Similarly, it is usually immaterial as to whether X in the general formula above given is hydrogen or chlorine since if it is hydrogen when added, it will usually be replaced by a chlorine atom by the hypochlorite. It may be more convenient to utilize catalysts wherein X is H because of the difficulty in isolating some catalysts wherein X is chlorine.

Thus, the catalyst of the present invention is a material containing a sulfamic group and may be added to the reaction mixture as a sulfamic acid or as a sulfamate. Further, the catalyst may be N-unsubstituted, N-monosubstituted, or N-disubstituted as hereinbefore discussed. It will be noted that the presence of the sulfamic grouping is the critical feature of this class of catalysts and it is relatively unimportant what particular cation is used in conjunction therewith. Similarly, the nature of the hydrocarbon group is not critical.

For convenience, the general method for preparing hexachlorocyclopentadiene by reaction of cyclopentadiene with aqueous hypochlorite will be discussed. The following discussion will be restricted to the use of sodium compound reactants, it being understood that other alkali metal compounds such as potassium and lithium are equivalent therewith.

The desired reaction of the present process is as follows:

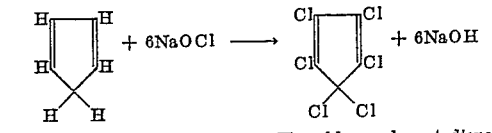

Cyclopentadiene     Hexachlorocyclopentadiene

The process therefore involves the reaction of sodium hypochlorite with cyclopentadiene. Since cyclopentadiene or most solvents therefor are not soluble in water or aqueous solutions, the reaction is necessarily two-phase and vigorous stirring to contact the reactants is desirable.

While the method of contacting the reactants is not critical it is generally more convenient to add the cyclopentadiene either with or without a solvent to an agitated aqueous alkaline solution of sodium hypochlorite. Agitation should be maintained until the reaction is completed. The organic and aqueous phase of the reaction mixture can then be allowed to separate and the organic phase can then be withdrawn therefrom. If a solvent be used for the cyclopentadiene, it can be removed from the crude reaction product comprising hexachlorocyclopentadiene, by distillation in vacuo if desired.

As previously stated, the cyclopentadiene can be initially dissolved in a relatively inert solvent or preferably can be utilized without solvent. Solvents which can be used for the cyclopentadiene are carbon tetrachloride, pentane, hexane, chloroform, isopropyl ether, or benzene. Many other suitable solvents will be suggested to one skilled in the art. Since the use of solvent is neither essential nor for several reasons preferred, there is no minimum amount of solvent which must be used. Further, while a maximum amount of solvent does not appear to be critical, it is undesirable to so dilute the cyclopentadiene as to substantially decrease the rate of reaction. By volume, a ratio of 10 to 1 of solvent to cyclopentadiene is still satisfactory. One reason for using a minimum of solvent or preferably no solvent at all is to minimize or make completely unnecessary the step of stripping solvent from the reaction product after the reaction is completed.

The reactants, namely cyclopentadiene and sodium hypochlorite can be intermixed rapidly or in a portionwise manner either in a batch container or in a continuously flowing stream wherein the reactants are proportionately injected and intimately contacted. The method of addition is thus not critical and any convenient means of intimately contacting immiscible liquids is satisfactory.

In accordance with the equation previously presented representing the desired reaction for the formation of hexachlorocyclopentadiene, it will be noted that 6 moles of sodium hypochlorite are required per mole of cyclopentadiene reacted. Thus, in theory, an optimum ratio of reactants is 6 moles of sodium hypochlorite per mole of cyclopentadiene. Actually, because of the inefficiency of the reaction in the absence of catalyst, a molar ratio of somewhat less than the 6 to 1 ratio would be preferred and probably about a 5 to 1 molar ratio is the optimum. When the improvement of the present invention is incorporated into the process the optimum ratio of reactants approximates the theoretical one above stated because of improved reaction and increased efficiency. While an excess of sodium hypochlorite may be used, this will result in excess hypochlorite remaining in the reaction mixture after reaction is complete and is therefore wasteful of this reactant. In the interest of economy, therefore, not more than a stoichiometric amount of sodium hypochlorite should be used, although as previously stated the use of an excess thereof such as a 50 or 100% excess or more is operable. Conversely, the use of substantially less than stoichiometric amounts of hypochlorite will result in the excessive production of undesirable side products, thereby diminishing the yield of the desired product, and may even result in there being unreacted cyclopentadiene or polymers thereof contaminating the product. Alternatively stated, while less than a stoichiometric amount of hypochlorite can be used, such as 5 to 3 or less moles of hypochlorite per mole of cyclopentadiene, such would be wasteful of cyclopentadiene and therefore more costly.

The sodium hypochlorite (which is used as an aqueous solution thereof) is maintained alkaline to prevent decomposition of the hypochlorite. It is known that hypochlorites are unstable in acid media. Since aqueous sodium hypochlorite is usually prepared by the chlorination of aqueous sodium hydroxide with chlorine in accordance with the following equation:

$$2NaOH + Cl_2 \rightarrow NaOCl + NaCl + H_2O$$

it is an easy matter to control the chlorination of the sodium hydroxide so that sufficient unreacted caustic remains in the solution to provide a stable alkaline medium for the sodium hypochlorite formed. The production of hexachlorocyclopentadiene by the present process is obviously not limited to any specific source or origin of hypochlorite. The usual source herein stated is hence merely exemplary. The degree of alkalinity required to provide stability to aqueous sodium hypochlorite is well known. It will be noted that as the chlorination of cyclopentadiene progresses, the hypochlorite solution becomes progressively more alkaline because of the sodium hydroxide formed. The concentration of sodium hypochlorite solution used may vary considerably. While the reaction appears to proceed more satisfactorily when the concentration of hypochlorite is low, extremely dilute solutions are undesirable because of the unnecessarily large volumes encountered. Solutions which are about 0.25 to about 4.0 or 4.5 molar with respect to sodium hypochlorite are well suited.

The chlorination of cyclopentadiene with hypochlorite is preferably conducted at mild temperatures. A lower temperature limitation is necessarily the freezing temperature of the hypochlorite solution used. Temperatures as high as about 50 or 60° C. or somewhat higher can also be used. It is preferred that the reaction temperature be retained within the range of about 0 or about −10° C. to about 50 or 60° C. while a more suitable range is from about 10 to about 50° C.

The reaction proceeds fairly rapidly, and the rate is dependent on temperature. For example, other factors being equivalent, the reaction proceeds more rapidly at 40° C. than at 0° C. The progress of the reaction can easily be traced by measuring the consumption of hypochlorite in the aqueous phase titrimetrically by well known means. Alternatively, the progress of the reaction can be followed by measuring the increase of alkalinity of the aqueous phase of the reaction mixture. The reaction is generally completed in a very short time such as one hour or less; however, excess reaction periods after completion are not harmful.

It was previously stated that sodium hypochlorite is usually prepared by the chlorination of sodium hydroxide with chlorine. According to this method, for each mole of hypochlorite produced there is also produced a mole of sodium chloride. The presence of this sodium chloride in the reaction mixture to the extent of equimolar amounts compared to sodium hypochlorite is undesirable, but not sufficiently deleterious as to require its removal. However, substantial improvements may be effected by the use of salt-free hypochlorite.

After reaction is completed, the organic phase can be allowed to separate from the spent sodium hypochlorite and can be withdrawn therefrom. If a solvent were used, it can be removed from the reaction product by distillation, or evaporation, in vacuo if desired. The crude product, free from organic solvents can be purified by fractional distillation in vacuo, if desired, with the fraction consisting of hexachlorocyclopentadiene boiling at about 62° C. to 72° C. at about 1.0 mm. to 1.5 mm. of mercury pressure.

The present invention is concerned with the improvement in the process for preparing hexachlorocyclopentadiene from cyclopentadiene by chlorination with hypochlorite by effecting said process after having added to the reaction mixture a catalyst of the type previously defined. The catalyst can be added to the hypochlorite reactant prior to introducing the cyclopentadiene which is a preferred method, or the catalyst can be added to the cyclopentadiene and introduced into the reaction mixture with it, or the catalyst can be added independently to the reaction mixture before reaction proceeds. Thus, any means of adding the catalyst is satisfactory provided the reaction proceeds in its presence.

The amount of catalyst used may vary over a wide range. The catalyst appears to act as a true one insofar as its beneficial results are concerned; that is, very small amounts are beneficial whereas larger amounts may also be used. In short, that which is ordinarily termed a catalytic amount is very satisfactory. Thus, beneficial results are obtained by adding as little as 0.01 mole per cent catalyst based on the amount of cyclopentadiene used. Similarly, as high as 10 mole percent catalyst based on cyclopentadiene has been used with improved results. A large excess of catalyst should be avoided because optimum benefits are derived from smaller amounts and the use of excess is wasteful. Further, N-unsubstituted or N-monosubstituted catalyst where the substituent is a hydrocarbon group will use up some of the hypochlorite as hereinbefore stated, and therefore, if large excesses are used, this must be considered as a factor in determining the optimum amount of hypochlorite to use. If the catalyst be an acid one, the stability of hypochlorite can be preserved by keeping the solution alkaline.

The removal of catalyst from the reaction mixture presents no problem since it remains in the aqueous phase and is withdrawn therewith. Thus, the problem of contamination of product with catalyst is not encountered.

To more clearly understand the present catalytic process and for a better appreciation of the advantages thereof, the following example is presented for the purpose of illustration and not limitation. While the catalyst shown in this example is sodium sulfamate, it is understood that

EXAMPLE 1

An aqueous solution of sodium hypochlorite (2,331 ml.; 1.294 molar; 3 moles) was placed in a round bottomed vessel equipped with an agitator, a reflux condenser, and a stoppered funnel for introducing cyclopentadiene. To this solution had been added sodium sulfamate (0.005 mole). The temperature of the hypochlorite solution was adjusted to $25+0.5°$ C. and while vigorously agitating this solution, cyclopentadiene (33.13 grams; 0.5 mole) was rapidly added. Since the chlorination reaction is exothermic, the original temperature of 25° C. was maintained by cooling. After about 20 minutes, the reaction was substantially complete with 81.8% of the sodium hypochlorite having been utilized as determined by titration of an aliquot of the reaction mixture with standard sodium thiosulfate solution.

The molar ratio of hypochlorite to cyclopentadiene in the above experiment was 6 to 1. Since the hypochlorite was obtained from the chlorination of alkali solution, there was an equivalent amount of sodium chloride present in the reaction mixture as compared with sodium hypochlorite. The amount of catalyst added was 1 mole percent based on the cyclopentadiene. It may also be noted that the hypochlorite solution was initially 0.262 molar in sodium hydroxide to insure stability. As the reaction proceeded the sodium hydroxide molarity increased and after about 20 minutes it was about 1.31.

After reaction was complete the entire reaction mixture was transferred to a separatory funnel and the lower (organic) layer was withdrawn therefrom. The crude chlorinated product was light yellow in color and there was only very little oily or semi-solid material at the interphase. In addition, the two layers readily separated.

The crude product weighed 108.25 grams and was fractionated in vacuo to obtain pure hexachlorocyclopentadiene. The pressure during fractionation was maintained at about 0.7 mm. of mercury. A first fraction boiling between about 28° C. and 60° C. which was lower boiling than hexachlorocyclopentadiene, constituted 28.34% of the crude product. The hexachlorocyclopentadiene fraction boiling between 60° C. and 62° C. constituted 54.76% of the crude product. A residue remained which constituted 13.58% of the crude product, leaving 3.32% loss in the fractionation. (Volatile material and handling loss.)

An experiment exactly identical to the above except that the catalyst sodium sulfamate was omitted was run with the following results which are compared with the above results.

| | Catalyst | No Catalyst |
|---|---|---|
| Wt. of chlorinated product_____grams__ | 108.25 | 101.19 |
| Composition of Chlorinated Product: | | |
| Hexachlorocyclopentadiene forerun percent__ | 28.34 | 32.64 |
| Hexachlorocyclopentadiene_____do____ | 54.76 | 43.76 |
| Fractionation residue_____do____ | 13.58 | 17.98 |
| Hypochlorite utilized_____do____ | 81.8 | 76.6 |
| Wt. pure hexachlorocyclopentadiene produced_____grams__ | 59.27 | 44.28 |
| Increment in hexachlorocyclopentadiene yield using catalyst_____do____ | 14.99 | |

It is thus seen that under identical conditions the use of 1 mole percent catalyst based on cyclopentadiene improved the yield of pure hexachlorocyclopentadiene by about 34%. Concomitant beneficial results from the use of catalyst were improved separability of the two phase reaction mixture, the production of less oily or semi-solid materials which collect at the reaction mixture interphase, lighter colored product, more efficient use of sodium hypochlorite and increased production of crude hexachlorocyclopentadiene which, as indicated, is richer in pure hexachlorocyclopentadiene.

Under varying conditions of temperature, catalyst concentration and salt concentration, the catalytic process is more efficient than its comparable non-catalytic one. Hypochlorite utilization is complete and the yield of pure hexachlorocyclopentadiene is substantially improved over the non-catalytic process. Likewise, the use of catalyst decreases the amount of undesirable side products and, in every case, increases the amount of chlorinated products. The chlorinated product derived from the use of catalyst is lighter in color than that derived from the non-catalytic process. It is more easily separated and removed from the reaction mixture with less tendency toward emulsification, and the amount of oily or semi-solid material at the interphase of the reaction mixture is considerably lessened by use of catalyst.

As aforementioned, although the chlorination of cyclopentadiene does not depend on any particular source of hypochlorite, said hypochlorite is usually prepared by chlorinating sodium hydroxide with chlorine. Where such is the case, the concentration of sodium chloride in solution is equivalent to the concentration of hypochlorite. It has been observed, that the chlorination reaction is impeded by the presence of excess amounts of salt. Since the hypochlorite in the present process reacts to form hydroxide it would be desirable to re-use the hydroxide thus formed by chlorinating it to produce more hypochlorite rather than dispose of it as waste. Such a recycle of operation of spent hypochlorite builds up the salt concentration in accordance with the following equations:

$$2NaOH + Cl_2 \rightarrow NaCl + NaOCl + H_2O$$

$$NaCl + NaOCl + Cyclopentadiene \rightarrow$$
$$Chlorinated\ Cyclopentadiene + NaCl + NaOH$$

$$NaCl + NaOH + \tfrac{1}{2} Cl_2 \rightarrow$$
$$1.5\ NaCl + \tfrac{1}{2}\ NaOCl + \tfrac{1}{2}\ H_2O$$

Thus where completely spent hypochlorite is rechlorinated to form fresh hypochlorite the sodium chloride concentration exceeds the hypochlorite concentration by a factor of three. In actual practice, since the hypochlorite is generally not completely utilized, the factor will be somewhat less than three for a complete recycle operation.

The use of catalyst in the present process minimizes the adverse effects of salt in the reaction mixture. For example, where the salt concentration exceeded the hypochlorite concentration by a factor of 2, the use of only 0.5% catalyst based on cyclopentadiene resulted in a yield of pure hexachlorocyclopentadiene equivalent to that obtained under identical conditions except that salt concentration was negligible and no catalyst was used.

Because of the favorable effect of the catalyst on the course of the present chlorination reaction, at least a partial recycling of spent hypochlorite supplemented by the addition of fresh caustic solution can be carried out with economic advantages where catalyst is used in the process.

I claim as my invention:

1. The process for preparing hexachlorocyclopentadiene which comprises reacting cyclopentadiene with an aqueous solution of an alkali-metal hypochlorite at a temperature of from about −10° C. to about 60° C., and adding to said reactants, as a catalyst, material having a sulfamic grouping and conforming with the formula

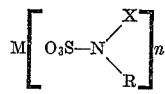

where M is a cation, $n$ is the valence of M, X is a member of the group consisting of hydrogen and chlorine, and R is a member of the group consisting of hydrogen and a hydrocarbon group, and maintaining the reaction mixture in an alkaline condition.

2. The process for preparing hexachlorocyclopentadiene which comprises reacting cyclopentadiene with an aqueous solution of an alkali metal hypochlorite at a temperature of from about 10° C. to about 50° C. and adding to the reactants sodium sulfamate as a catalyst, and maintaining the reaction mixture in an alkaline condition.

3. The process for preparing hexachlorocyclopentadiene which comprises reacting cyclopentadiene with an aqueous solution of sodium hypochlorite at a temperature of from about 10° C. to about 50° C. and adding to said reactants sodium sulfamate as a catalyst and maintaining the reaction mixture in an alkaline condition.

4. The process for preparing hexachlorocyclopentadiene which comprises reacting cyclopentadiene with at least an approximately stoichiometric amount of alkaline metal hypochlorite in an aqueous solution at a temperature of from about 10° C. to about 50° C. and adding to said reactants, as a catalyst, material having a sulfamic grouping and conforming with the formula

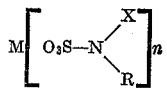

where M is a cation, $n$ is the valence of M, X is a member of the group consisting of hydrogen and chlorine and R is a member of the group consisting of hydrogen and a hydrocarbon group, and maintaining the reaction mixture in an alkaline condition.

5. The method of chlorinating cyclopentadiene which comprises agitating and reacting cyclopentadiene with aqueous sodium hypochlorite at a temperature of from about 10° C. to about 50° C. in a molar ratio of about 1 to 6 and adding to said reactants sodium sulfamate as a catalyst and maintaining the reaction mixture in an alkaline condition.

MORTON KLEIMAN.

References Cited in the file of this patent

UNITED STATES PATENTS

| Number | Name | Date |
|---|---|---|
| 2,425,340 | Nixon et al. | Aug. 12, 1947 |

OTHER REFERENCES

Straus et al., "Ber. der deut. Chem. (Gesell)," vol. 63, page 1884, (1930).